(12) United States Patent
Komori (10) Patent No.: US 8,359,618 B2
(45) Date of Patent: Jan. 22, 2013

(54) COMMUNICATION APPARATUS

(75) Inventor: Kenji Komori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 12/860,626

(22) Filed: Aug. 20, 2010

(65) Prior Publication Data

US 2011/0162014 A1    Jun. 30, 2011

(30) Foreign Application Priority Data

Dec. 25, 2009  (JP) ................................ 2009-294257

(51) Int. Cl.
  *H04N 7/173*   (2011.01)
  *G09G 5/00*    (2006.01)
  *G08B 1/08*    (2006.01)
  *H04N 5/44*    (2011.01)

(52) U.S. Cl. ............. 725/80; 725/81; 345/211; 348/730

(58) Field of Classification Search .................... 725/80, 725/130, 81, 812, 141; 348/553, 730; 345/211, 345/212, 21

See application file for complete search history.

(56) References Cited

U.S. PATENT DOCUMENTS

| | | | |
|---|---|---|---|
| 6,005,559 A * | 12/1999 | Miyamoto | 345/212 |
| 6,874,091 B2 * | 3/2005 | Min | 713/300 |
| 6,892,387 B1 * | 5/2005 | Lee | 725/23 |
| 2007/0200696 A1 * | 8/2007 | Goto et al. | 340/539.15 |
| 2008/0232209 A1 * | 9/2008 | Vergoossen et al. | 369/47.5 |
| 2010/0031297 A1 * | 2/2010 | Klein et al. | 725/78 |
| 2010/0058428 A1 * | 3/2010 | Kim | 725/131 |
| 2010/0097530 A1 * | 4/2010 | Hasegawa et al. | 348/731 |
| 2011/0162014 A1 * | 6/2011 | Komori | 725/74 |

FOREIGN PATENT DOCUMENTS

| | | |
|---|---|---|
| JP | 2003-179776 | 6/2003 |
| JP | 2004-116386 | 4/2004 |
| JP | 2004-139841 | 5/2004 |
| JP | 2005-223443 | 8/2005 |
| JP | 2006-227700 | 8/2006 |
| JP | 2006-325102 | 11/2006 |
| JP | 2007-006169 | 1/2007 |
| JP | 2008-034907 | 2/2008 |
| JP | 2009-065584 | 3/2009 |
| JP | 2009-278262 | 11/2009 |
| JP | 2010-206675 | 9/2010 |

OTHER PUBLICATIONS

Office Action in counterpart Japanese Application No. JP 2009-294257, dated Nov. 16, 2010 and English translation.
Office Action in counterpart Japanese Application No. JP 2009-294257, dated Mar. 4, 2010 and English translation.

* cited by examiner

*Primary Examiner* — Pankaj Kumar
*Assistant Examiner* — Reuben M Brown
(74) *Attorney, Agent, or Firm* — Patterson & Sheridan, LLP (57) ABSTRACT

According to one embodiment, a communication system includes a video signal receiver, a video signal output module, a power control signal receiver, and a socket. The video signal receiver is configured to receive a video signal from a first external apparatus. The video signal output module is configured to output, to a second external apparatus, the video signal received from the first external apparatus. The power control signal receiver is configured to receive a power control from the first external apparatus. The power control signal receiver is lower in power consumption than the video signal receiver. A power cable configured to supply power to the second external apparatus is connected to the socket. When the power control signal receiver receives a power control signal for activation, power is supplied to the video signal receiver and the socket.

2 Claims, 5 Drawing Sheets

COMMUNICATION APPARATUS

CROSS REFERENCE TO RELATED APPLICATION(S)

This application is based upon and claims the benefit of priority from Japanese Patent Application No. 2009-294257 filed on Dec. 25, 2009, the entire contents of which are incorporated herein by reference.

BACKGROUND

1. Field

Embodiments described herein relate generally to a communication apparatus.

2. Description of the Related Art

In recent years, from the viewpoint of ecology etc., the reduction of power consumption has come to be required. There is a socket device for switching between the supply and the shutoff of a power supply voltage to a socket in link with operation of a power switch that is provided in a personal computer main body.

However, in the socket device, no consideration is given to the linkage between the power switching and flows of a video signal, control signals, etc. More specifically, for example, peripheral devices will not necessarily be used even if the personal computer main body is powered on. This type of control method may cause useless power consumption.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, a communication system includes a video signal receiver, a video signal output module, a power control signal receiver, and a socket. The video signal receiver is configured to receive a video signal from a first external apparatus. The video signal output module is configured to output, to a second external apparatus, the video signal received from the first external apparatus. The power control signal receiver is configured to receive a power control signal from the first external apparatus. The power control signal receiver is lower in power consumption than the video signal receiver. A power cable configured to supply power to the second external apparatus is connected to the socket. When the power control signal receiver receives a power control signal for activation, power is supplied to the video signal receiver and the socket.

Communication apparatus according to an exemplary embodiment of the present invention will be hereinafter described with reference to the drawings.

Figure 1:
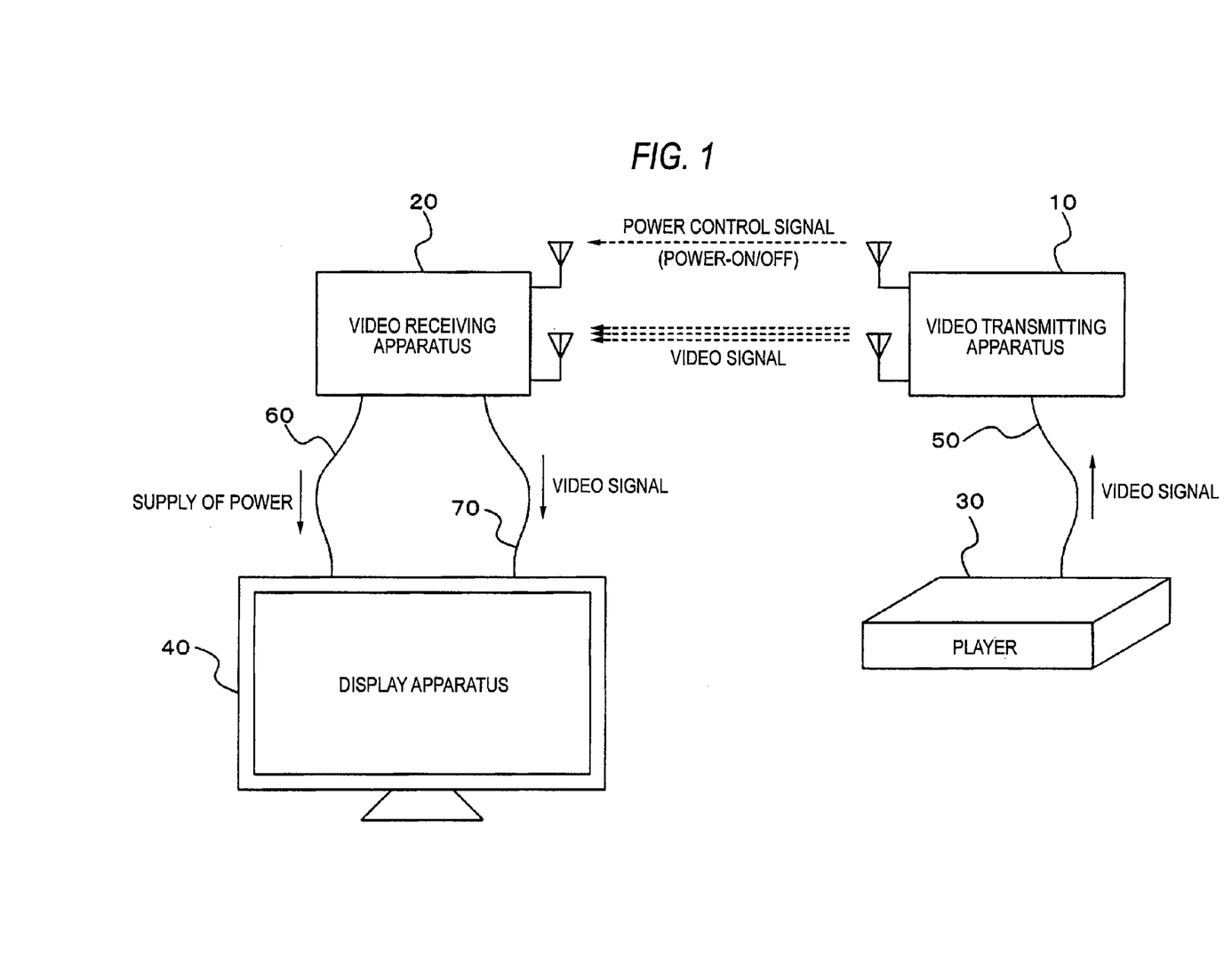
FIG. 1 is an exemplary diagram showing a communication system including communication apparatuses according to an embodiment.

First, the configuration of a system including a video receiving apparatus and a video transmitting apparatus, which are communication apparatuses according to the exemplary embodiment of the invention, will be described with reference to FIG. 1.

This communication system includes a video transmitting apparatus 10, a video receiving apparatus 20, a player (source apparatus) 30, and a display apparatus (sync apparatus) 40. In the exemplary embodiment, the player 30 decodes coded data into a non-compressed video signal, which is transmitted to the display apparatus 40 via the video transmitting apparatus 10 and the video receiving apparatus 20 while being kept non-compressed. The display apparatus 40 displays video on the basis of the received video signal.

The player 30 is connected to the video transmitting apparatus 10 by an HDMI cable 50, for example. As described above, a video signal decoded by the player 30 is output to the video transmitting apparatus 10 via the HDMI cable 50. Control signals (CEC commands) are communicated between the player 30 and the video transmitting apparatus 10 using the CEC line, for example, of the HDMI cable 50. More specifically, control signals for menu picture display switching, power-on, power-off (including standby), etc. are transmitted. Control signals can be communicated bidirectionally between the player 30 and the video transmitting apparatus 10. CEC commands can be communicated bidirectionally between any two of the player 30, the video transmitting apparatus 10, the video receiving apparatus 20, and the display apparatus 40.

The video transmitting apparatus 10 sends, by radio, the video signal received from the player 30 while keeping it non-compressed. At this time, the video transmitting apparatus 10 can send the video signal according to the Wireless HD standard or the like. In Wireless HD transmission between the video transmitting apparatus 10 and the video receiving apparatus 20, control signals such as CEC commands can be transmitted as in the case of HDMI (high-definition multimedia interface).

Furthermore, the video transmitting apparatus 10 can send a power control signal for power on/off switching to the video receiving apparatus 20 according to a communication method (e.g., IrDA) other than Wireless HD. The communication method that is used for communicating such a power control signal is required to be lower at least in the standby power of each communication module used than Wireless HD which is used for transmission of a video signal. In particular, it is desirable that the standby power of the communication module used for communication of a power control signal in the video receiving apparatus 20 be so low that a signal can be communicated (received) only by power that is supplied from a capacitor (without supply of external power).

The video receiving apparatus 20 is connected to the display apparatus 40 by an HDMI cable 70, for example. As described above, the non-compressed video signal that the video receiving apparatus 20 receives from the video transmitting apparatus 10 is output to the display apparatus 40 via the HDMI cable 70. Control signals (CEC commands) can be communicated between the video receiving apparatus 20 and the display apparatus 40 using the CEC line of the HDMI cable 70.

Furthermore, the video receiving apparatus 20 has a socket (not shown in FIG. 1) and a power cable 60 for supplying power to the display apparatus 40 is connected to the socket. When the power cable 60 is connected to the video receiving apparatus 20, power is supplied from the video receiving apparatus 20 to the display apparatus 40. The display apparatus 40 is thus enabled to perform display and other operations.

In this communication system, as described above, between the video transmitting apparatus 10 and the video receiving apparatus 20, transmission can be performed according to the two communication methods, that is, Wireless HD or a like communication method for transmission of a video signal and control signals (CEC commands) and IrDA or a like communication method for transmission of a power control signal (for power on/off switching). In Wireless HD for transmission of a video signal, the power consumption of each communication module is higher than in IrDA etc. for transmission of a power control signal. In the following description, it is assumed that each communication module to be used for transmission of a power control signal can operate on power that is supplied from a capacitor or the like without receiving any power from an external power source (not shown).

While the video receiving apparatus 20 is powered off, the supply of power to the entire video receiving apparatus 20 including the socket, to which the power cable 60 for supplying power to the display apparatus 40 is connected, is shut off. As a result, while the video receiving apparatus 20 is powered off, no externally supplied power is consumed and the standby power can be made zero in both of the display apparatus 40 and the video receiving apparatus 20.

On the other hand, when transmission of a video signal is started, the player 30, for example, commands activation etc. (including transmission of a CEC command that commands an operation including activation) by a CEC command or the like. At this time, the video transmitting apparatus 10 sends a power control signal for power-on to the video receiving apparatus 20. As a result, power is supplied to the entire video receiving apparatus 20 including the socket for supplying power to the power cable 60. In this manner, not only the video receiving apparatus 20 but also the display apparatus 40 can be activated.

Figure 2:
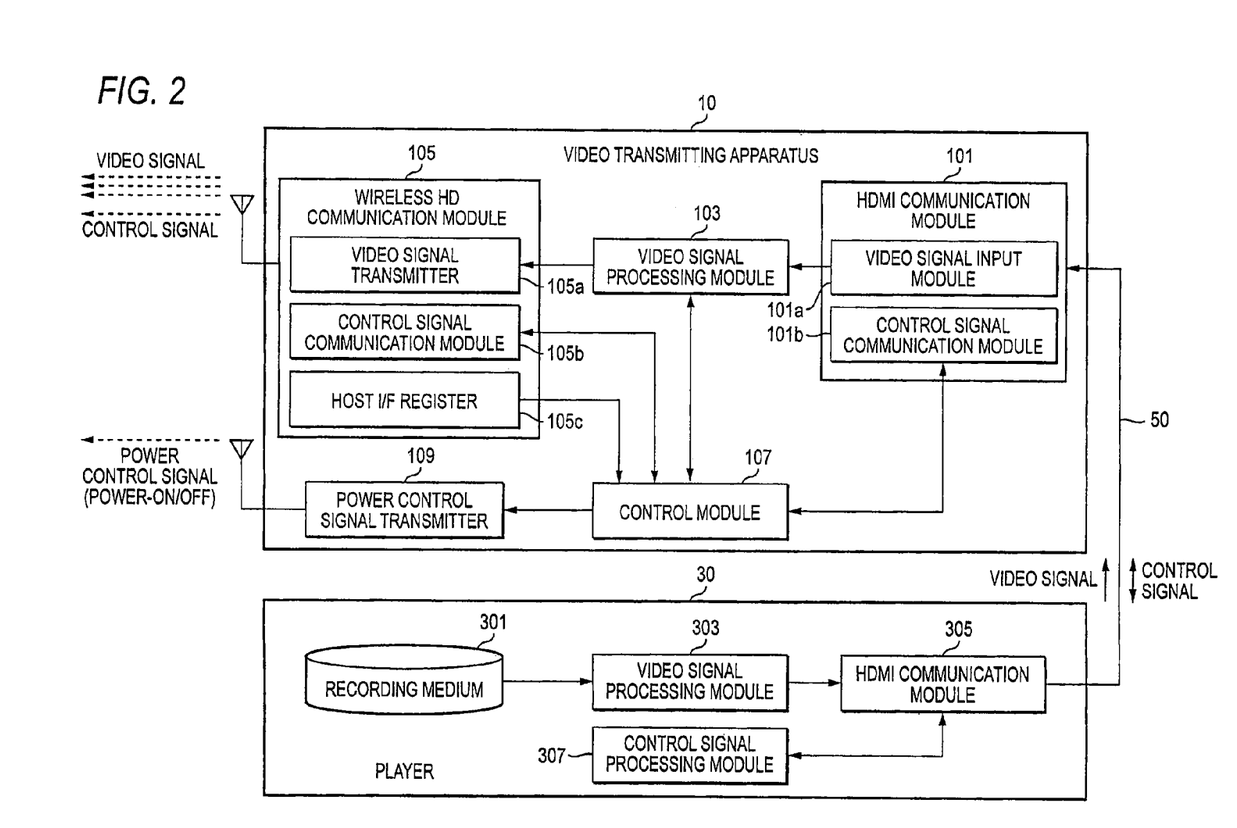
FIG. 2 is an exemplary block diagram showing a configuration of a transmitting-side apparatus of the communication system including the communication apparatuses according to the embodiment.

Next, the configurations of the video transmitting apparatus 10 and the player 30 will be described with reference to FIG. 2. FIG. 2 shows the configurations of the video transmitting apparatus 10 and the player 30.

The player 30 includes a video signal processing module 303, an HDMI communication module 305, and a control signal processing module 307.

The video signal processing module 303 decodes coded video data that is recorded on a recording medium 301 into a non-compressed video signal. The recording medium 301 may be either a built-in recording medium or an external recording medium. Video data that is decoded by the video signal processing module 303 may be either video data recorded on the recording medium 301 or video data that is acquired from broadcast waves received by a tuner (not shown).

The HDMI communication module 305 performs prescribed encryption on the video signal produced by the video signal processing module 303 through decoding and outputs a resulting video signal to the video transmitting apparatus 10 via the HDMI cable 50 while keeping it non-compressed.

The control signal processing module 307 processes a control signal (control command) such as a CEC command that has been received or to be sent by the HDMI communication module 305. More specifically, the CEC command makes it possible to give each apparatus on the HDMI network an instruction such as display of a menu picture, transition to a standby mode, or an instruction using a remote control signal (e.g., playback/halt or channel switching) by specifying a physical address indicating a position on the network topology. The control signal processing module 307 sends a CEC command to each apparatus on the HDMI network via the HDMI communication module 305 according to, for example, an instruction from the user (made by manipulating a remote controller, for example) and performs processing corresponding to a CEC command that originates from each apparatus on the HDMI network and is received by the HDMI communication module 305.

Whereas a video signal can be output unidirectionally from the player 30 to the video transmitting apparatus 10, a CEC command can be communicated bidirectionally between the video transmitting apparatus 10 and the player 30.

Next, the configuration of the video transmitting apparatus 10 will be described. The video transmitting apparatus 10 is equipped with an HDMI communication module 101, a video signal processing module 103, a Wireless HD communication module 105, a control module 107, and a power control signal transmitter 109.

The HDMI communication module 101 has a video signal input module 101*a* and a control signal communication module 101*b*. The video signal input module 101*a* decodes (decrypts) an encrypted, non-compressed video signal received from the player 30 and outputs a resulting video signal to the video signal processing module 103. The control signal communication module 101*b* exchanges control signals such as CEC commands with the player 30 under the control of the control module 107.

The video signal processing module 103 outputs the video signal received from the HDMI communication module 101 to a video signal transmitter 105*a* of the Wireless HD communication module 105 under the control of the control module 107.

The Wireless HD communication module 105 has the video signal transmitter 105*a*, a control signal communication module 105*b*, and a host interface (I/F) register 105*c*. The video signal transmitter 105*a* receives the non-compressed video signal from the video signal processing module 103, encrypts it, and sends a resulting video signal to the video receiving apparatus 20 while keeping it non-compressed.

The control signal communication module 105*b* exchanges control signals such as CEC commands with the video receiving apparatus 20 under the control of the control module 107.

The host interface register 105*c* is a register (memory) for storing a state (activated or not) of the display apparatus 40 (sync apparatus). In the exemplary embodiment, since the power cable 60 of the display apparatus 40 is connected to the socket of the video receiving apparatus 20, the state (activated or not) of the display apparatus 40 coincides with that of the video receiving apparatus 20. Therefore, it suffices that the host interface register 105*c* store information indicating whether the video receiving apparatus 20 is activated or not (i.e., whether the Wireless HD communication module 105 is in a state that it can communicate with the video receiving apparatus 20).

The method for checking the activation/deactivation state of the display apparatus 40 (sync apparatus) is not limited to checking the activation/deactivation state of the video receiving apparatus 20. For example, it is possible to send a CEC command from the control signal communication module 105b to the display apparatus 40 and make a judgment on the basis of whether a response to it is received.

The control module 107, which is composed of, for example, a CPU (central processing unit), memories, etc., supervises the individual modules of the video transmitting apparatus 10. The control module 107 performs controls relating to a CEC command received from or to be sent to the player 30 via the control signal communication module 101b of the HDMI communication module 101, a CEC command received from or to be sent to the video receiving apparatus 20 via the control signal communication module 105b of the Wireless HD communication module 105, and a power control signal to be sent to the video receiving apparatus 20 using the power control signal transmitter 109. If a CEC command received by the HDMI communication module 101 is directed to the display apparatus 40 (sync apparatus), the control module 107 causes the control signal communication module 105b of the Wireless HD communication module 105 to send the CEC command to display apparatus 40. Likewise, if a CEC command received by the Wireless HD communication module 105 is directed to the player 30 (source apparatus), the control module 107 causes the control signal communication module 101b of the HDMI communication module 101 to send the CEC command to the player 30.

In particular, when receiving, from the player 30, a CEC command that commands an operation including power-on of the display apparatus 40, more specifically, an "image view on" command or a "text view on" command that commands display of a menu picture, the control module 107 causes the power control signal transmitter 109 to send a power control signal for powering-on the video receiving apparatus 20 to the video receiving apparatus 20. The HDMI standard prescribes that an "image view on" command and a "text view on" command should be such as to cause power-on of an apparatus that has received it if the apparatus is powered off.

The power control signal transmitter 109 sends a power control signal for power-on or off to the video receiving apparatus 20 under the control of the control module 107. In particular, as described above, when the HDMI communication 101 receives a CEC command for activating the display apparatus 40, the power control signal transmitter 109 sends a power control signal for power-on to the video receiving apparatus 20.

Figure 3:
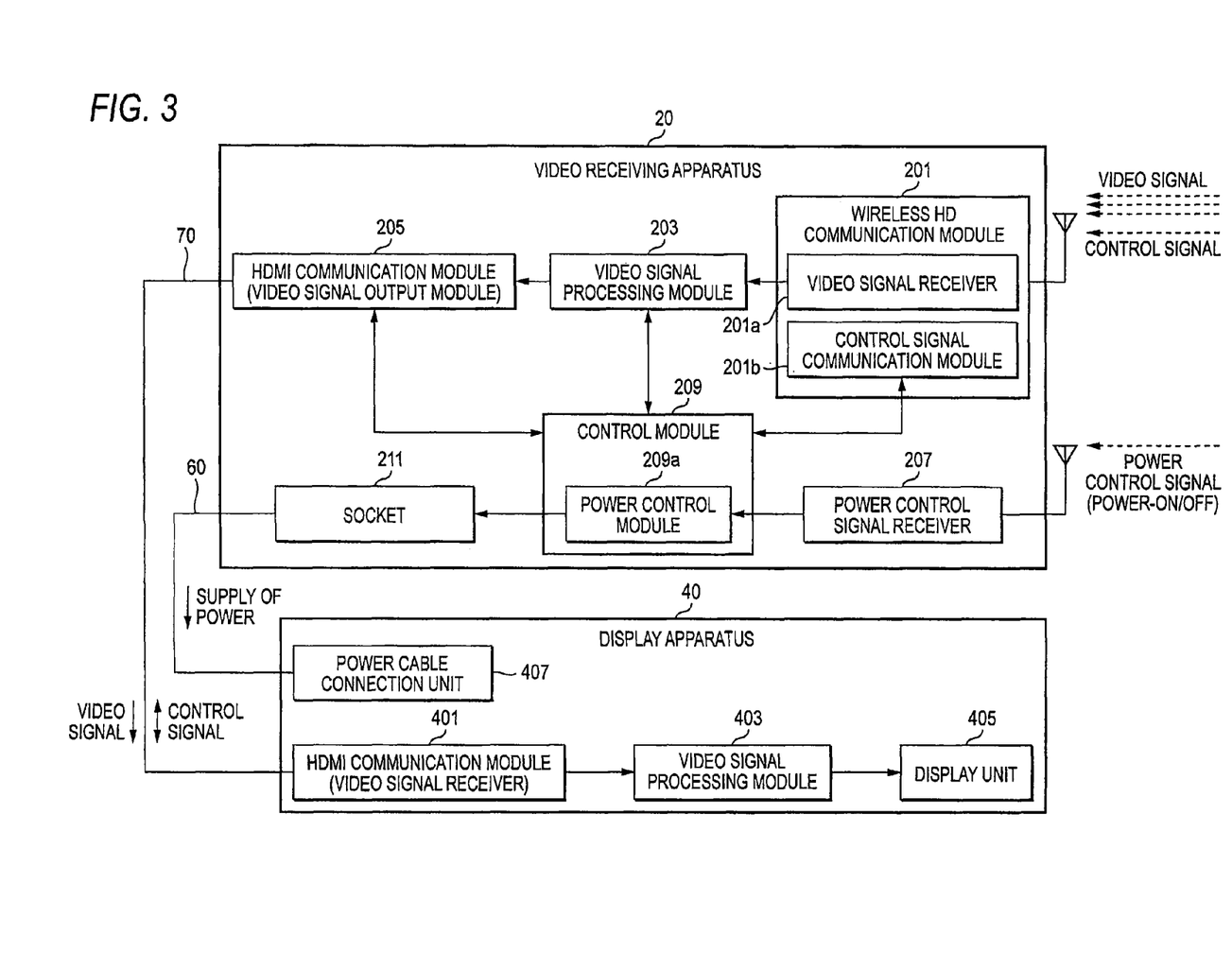
FIG. 3 is an exemplary block diagram showing a configuration of a receiving-side apparatus of the communication system including the communication apparatuses according to the embodiment.

Next, the configurations of the video receiving apparatus 20 and the display apparatus 40 will be described with reference to FIG. 3. FIG. 3 shows the configurations of the video receiving apparatus 20 and the display apparatus 40.

A Wireless HD communication module 201 has a video signal receiver 201a and a control signal communication module 201b. The video signal receiver 201a receives an encrypted, non-compressed video signal from the video transmitting apparatus 10, decodes (decrypts) it, and outputs a resulting video signal to a video signal processing module 203.

The control signal communication module 201b exchanges control signals such as CEC commands bidirectionally with the video transmitting apparatus 10 under the control of a control module 209.

The HDMI communication module 205 encrypts the video signal received from the video signal processing module 203 and sends a resulting video signal to the display apparatus 40 while keeping it non-compressed under the control of the control module 209. Furthermore, the HDMI communication module 205 exchanges CEC commands with the display apparatus 40 bidirectionally under the control of the control module 209.

A power control signal receiver 207 receives a power control signal for power-on or off from the video transmitting apparatus 10. As described above, the communication of a power control signal is performed by a communication method such as IrDA which is different from Wireless HD. In the exemplary embodiment, it is assumed that the power control signal receiver 207 is sufficiently low in standby power consumption and hence can perform a receiving operation for a long time using only power that is supplied from a built-in capacitor without receiving external power. When receiving a power control signal for power-on during a standby period when the video receiving apparatus 20 does not receive external power, the power control signal receiver 207 outputs a signal indicating the reception of the power control signal to a power control module 209a of the control module 209.

The control module 209, which is composed of, for example, a CPU, memories, etc., supervises the individual modules of the video receiving apparatus 20. The control module 209 performs processing relating to a CEC command received by the control signal communication module 201b of the Wireless HD communication module 201 or the HDMI communication module 205. When the power control signal receiver 207 receives a power control signal for power-on, the control module 209 causes the power control module 209a, which receives the signal indicating the reception of the power control signal, to start supplying power to the entire video receiving apparatus 20 including a socket 211 and to thereby activate the entire video receiving apparatus 20. As described above, the power cable 60 for supplying power to the display apparatus 40 is connected to the socket 211.

Next, the configuration of the display apparatus 40 will be described. The display apparatus 40 is equipped with an HDMI communication module 401, a video signal processing module 403, a display unit 405, and a power cable connection unit 407. The HDMI communication module 401 decodes (decrypts) an encrypted, non-compressed video signal received from the video receiving apparatus 20 and outputs a resulting video signal to the video signal processing module 403.

The video signal processing module 403 converts the video signal that is output from the HDMI communication module 401 into a display signal, and outputs the display signal to the display unit 405 to cause the display unit 405 to display video.

The power cable connection unit 407 includes a connection terminal to which the power cable 60 which is connected to the socket 211 of the video receiving apparatus 20 is connected. When power is supplied to the power cable connection unit 407, the display apparatus 40 is supplied with power and activated.

Figure 4:
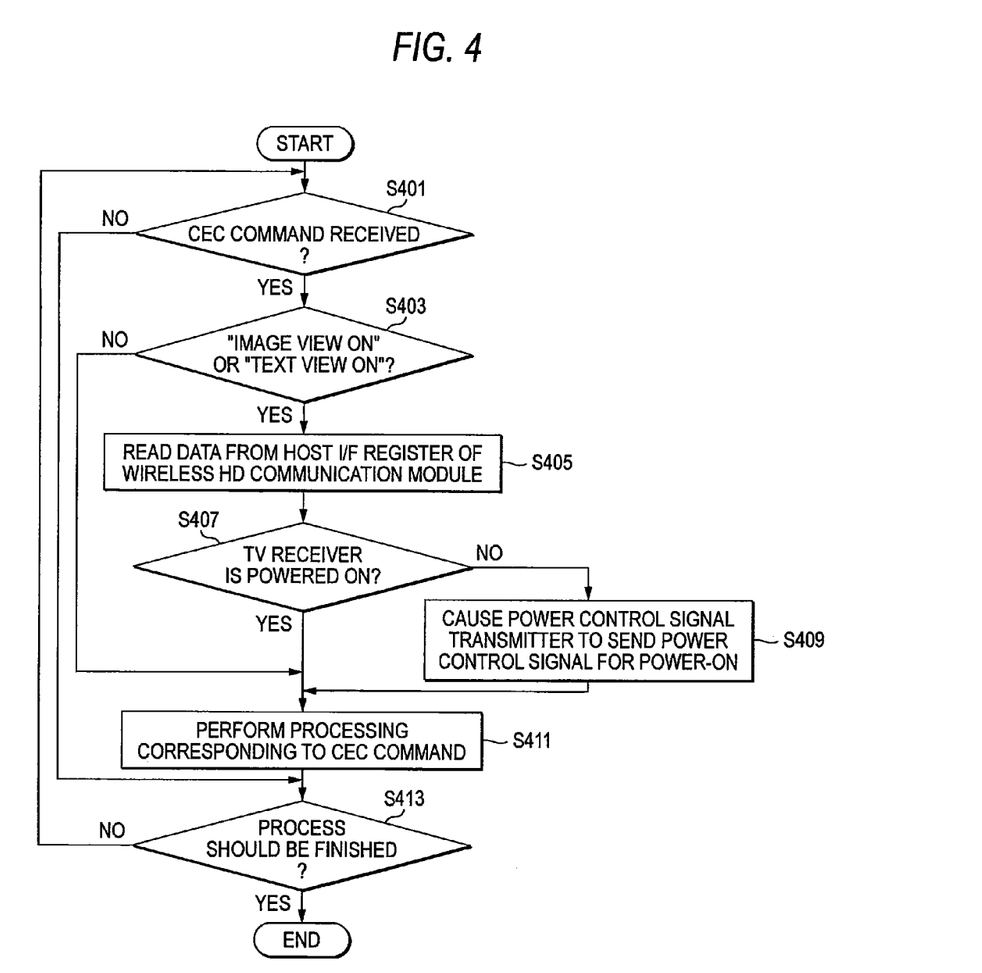
FIG. 4 is an exemplary flowchart showing an operation of a video transmitting apparatus according to the embodiment.

Next, a process which is executed by the video transmitting apparatus 10 will be described with reference to FIG. 4. FIG. 4 is a flowchart of the process which is executed by the video transmitting apparatus 10.

In the video transmitting apparatus 10, when the control signal communication module 101b of the HDMI communication module 101 receives a CEC command (S401: yes), at step S403 the control module 107 judges whether the CEC command is an "image view on" command or a "text view on" command.

If the CEC command is an "image view on" command or a "text view on" command, at step S405 the control module 107 reads data from the host interface register 105c of the Wireless HD communication module 105. At step S407, the control module 107 judges whether the display apparatus 40 (TV receiver) is already activated. If the display apparatus 40 is not activated (i.e., the video receiving apparatus 20 is not activated) (S407: no), at step S409 the control module 107 causes the power control signal transmitter 109 to send a power control signal for power-on to the video receiving apparatus 20.

If the CEC command received from the player 30 is neither an "image view on" command nor a "text view on" command (S403: no), the display apparatus 40 is activated (S407: yes), or the power control signal transmitter 109 sent a power control signal for power-on at S409, at step S411 the control module 107 performs processing corresponding to the CEC command that was received at step S401. More specifically, if, for example, the CEC command is directed to the display apparatus 40, the control module 107 causes the control signal communication module 105b of the Wireless HD communication module 105 to send the CEC command to the video receiving apparatus 20.

After processing the CEC command at step S411, at step S413 the control module 107 judges whether to finish the process. If the process should not be finished (S413: no), the control module 107 returns to step S401 and is rendered in a CEC command reception standby state.

Figure 5:
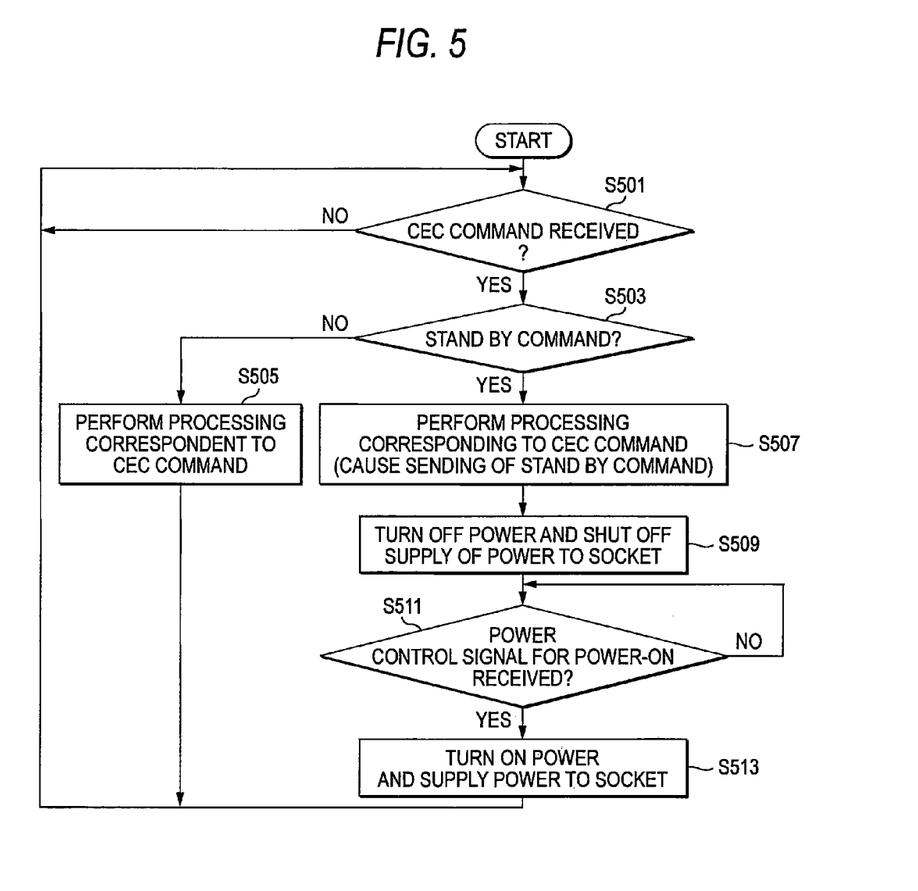
FIG. 5 is an exemplary flowchart showing an operation of a video receiving apparatus according to the embodiment.

Next, a process which is executed by the video receiving apparatus 20 will be described with reference to FIG. 5. FIG. 5 is a flowchart of the process which is executed by the video receiving apparatus 20.

In the video receiving apparatus 20, when the control signal communication module 201b of the Wireless HD communication module 201 receives a CEC command (S501: yes), at step S503 the control module 209 judges whether the CEC command is a standby command that is directed to the display apparatus 40.

If the CEC command is a standby command (S503: yes), at step S507 the control module 209 causes the HDMI communication module 205 to send the CEC command to the display apparatus 40. After a lapse of a sufficient time to render the display apparatus 40 in a standby state from the sending of the CEC command, at step S509 the control module 209 performs a control of powering off the video receiving apparatus 20 and shuts off the supply of power to the entire video receiving apparatus 20 including the socket 211.

If the CEC command received at step S501 is not a standby command (S503: no), at step S505 the control module 209 performs processing corresponding to the command ordinarily. Then, the control module 209 returns to step S501, where it waits for reception of a CEC command.

If the power control signal receiver 207 receives a power control signal for power-on (S511: yes) after the video receiving apparatus 20 was powered off at step S509 (even after the power-off of the video receiving apparatus 20, the power control signal receiver 207 continues to operate on the power supplied from the built-in capacitor and hence can receive a power control signal), at step S513 the power control signal receiver 207 outputs a signal indicating the reception of the power control signal to the power control module 209a of the control module 209 to start supply of power to the entire video receiving apparatus 20 including the socket 211 and to activate the entire video receiving apparatus 20. As a result, the display apparatus 40 is also activated because it is supplied with power via the power cable 60 which is connected to the socket 211. After the activation, the control module 209 returns to step S501, where it waits for reception of a new CEC command.

A described above, according to the exemplary embodiment, since the video receiving apparatus 20 has the socket 211 to which the power cable 60 for supplying power to the display apparatus 40 can be connected, the video receiving apparatus 20 and the display apparatus 40 are activated and deactivated in a linked manner. When receiving a CEC command or the like for deactivating the display apparatus 40, the video receiving apparatus 20 is also powered off, whereby the standby power of each of the video receiving apparatus 20 and the display apparatus 40 can be made approximately equal to zero. This advantage is more remarkable in the case where the power control signal receiver 207 for power-on does not require supply of external power.

In powering on the video receiving apparatus 20, in response to transmission of a power control signal from the video transmitting apparatus 10 (this is done by the module that is different from the module for sending a video signal), the video receiving apparatus 20 can perform a power-on control without the need for activating the Wireless HD communication module 201 which consumes much power. And both of the video receiving apparatus 20 and the display apparatus 40 can be activated. After the activation of the video receiving apparatus 20, a communication path for a video signal is secured. Therefore, the power consumption can be reduced properly in link with a flow of data.

In the video receiving apparatus 20 according to the exemplary embodiment, when a power-off instruction is received from the video transmitting apparatus 10 in the form of a CEC command or the like, first the CEC command indicating the reception of the power-off instruction is output to the display apparatus 40 and then the supply of power to the entire video receiving apparatus 20 including the socket 211 is shut off after a lapse of a sufficient time. This prevents an event that the supply of power to the display apparatus 40 is shut off forcibly in a state that the display apparatus 40 has not prepared for power-off yet.

The video transmitting apparatus 10 is equipped with the register 105c which enables a check of the activation/deactivation state of the display apparatus 40, and whether to send a power control signal is judged according to the activation/deactivation state. This makes it possible to prevent unnecessary sending and reception of a power control signal.

When receiving a CEC command that commands an operation including power-on of the display apparatus 40, the video transmitting apparatus 10 sends the CEC command to the video receiving apparatus 20 by means of the Wireless HD communication module 105 after activating the video receiving apparatus 20 using a power control signal. This allows the display apparatus 40 to perform such an operation as display of a menu picture in response to the CEC command.

While certain embodiments have been described, these embodiments have been presented by way of example only, and are not intended to limit the scope of the invention. Indeed, the novel apparatus described herein may be embodied in a variety of other forms; furthermore, various omissions, substitutions and changes in the form of the apparatus described herein may be made without departing from the spirit of the invention. The accompanying claims and their equivalents are intended to cover such forms or modifications as would fall within the scope and sprit of the invention.

What is claimed is:
1. A communication apparatus comprising:
a video signal receiver configured to receive a video signal from a first external apparatus;
a video signal output module configured to output, to a second external apparatus, the video signal received from the first external apparatus;
a power control signal receiver configured to receive a power-on control signal from the first external apparatus, the power control signal receiver having lower power consumption than the video signal receiver;

a socket configured to supply power to the second external apparatus through a power cable;

a control signal receiver configured to receive a power-off control signal from the first external apparatus while a communication is made bidirectionally between the control signal receiver and the first external apparatus, the control signal receiver having higher power consumption than the power control signal receiver; and a controller configured to (1) supply power to the video signal receiver and the socket when the power control signal receiver receives the power-on control signal, (2) to control the video signal output module to send the power-off control signal to the second external apparatus, and (3) to shut off the supply of power to the socket and the communication apparatus when the control signal receiver receives the power-off control signal.

2. The apparatus according to claim 1, wherein the video signal output module is configured to send the power-off control signal to the second external apparatus before the shutoff of the supply of power to the socket by the controller while a communication is made bidirectionally between the video signal output module and the second external apparatus.

* * * * *